United States Patent [19]

Driessen et al.

[11] Patent Number: 5,107,970

[45] Date of Patent: Apr. 28, 1992

[54] HIGH PRESSURE SEALING SYSTEM AND METHOD

[75] Inventors: Jan N. Driessen, Hasselt; Bert E. Vanroye, Borgloon, both of Belgium

[73] Assignee: Monroe Auto Equipment Company, Monroe, Mich.

[21] Appl. No.: 686,666

[22] Filed: Apr. 17, 1991

[51] Int. Cl.$^5$ .............................................. F16F 9/36
[52] U.S. Cl. ........................... 188/322/16; 188/314; 188/322.17; 267/64.28; 277/58; 277/59
[58] Field of Search .............. 188/297, 322.16, 322.17, 188/277, 314, 281; 267/64.28; 277/58, 59, 138, 148, 167.3

[56] References Cited

U.S. PATENT DOCUMENTS

| | | | |
|---|---|---|---|
| 3,323,806 | 6/1967 | Smith et al. | 277/58 X |
| 3,943,717 | 3/1976 | Schexnagder | 277/59 X |
| 4,128,248 | 12/1978 | Kabelitz et al. | 277/59 X |
| 4,222,575 | 9/1980 | Sekiguchi et al. | 277/59 |
| 4,335,871 | 6/1982 | Mölders | 267/64.28 |
| 4,756,536 | 7/1988 | Belcher | 277/59 X |
| 4,865,170 | 9/1989 | Ciepichal | 188/322.17 |
| 4,900,039 | 2/1990 | Klecker et al. | 277/59 X |
| 4,995,485 | 2/1991 | Nakamura et al. | 188/322.17 |
| 5,011,121 | 4/1991 | Oriola et al. | 267/64.28 X |

FOREIGN PATENT DOCUMENTS

| | | | |
|---|---|---|---|
| 0180848 | 10/1983 | Japan | 267/64.28 |
| 0176808 | 9/1985 | Japan | 188/322.17 |
| 632496 | 11/1949 | United Kingdom | 188/314 |
| 2052010 | 1/1981 | United Kingdom | 267/64.28 |

*Primary Examiner*—Robert J. Oberleitner
*Assistant Examiner*—Peter M. Poon
*Attorney, Agent, or Firm*—Harness, Dickey & Pierce

[57] ABSTRACT

A sealing system for a hydraulic actuator is disclosed which is operable to selectively change the frictional sealing force exerted on a piston rod in response to the fluid pressure acting on the sealing system. The sealing system includes a leakage chamber formed in a rod guide surrounding a moveable piston rod which is partially disposed within a working chamber. A first seal member is operable for permitting a predetermined amount of hydraulic fluid to leak from the working chamber to the leakage chamber. The leakage chamber is in fluid communication with a low pressure fluid reservoir. A flow control valve selectively controls the flow of hydraulic fluid from the leakage chamber to the fluid reservoir so as to change the fluid pressure within the leakage chamber. A pressure responsive seal assembly concentrically engages the piston rod intermediate the leakage chamber and an upper end of the hydraulic actuator. The pressure responsive seal assembly is operable to inhibit leakage of hydraulic fluid along the piston rod from the leakage chamber to the exterior of the hydraulic actuator. The pressure responsive sealing assembly is energizable in response to an increased fluid pressure within the leakage chamber for generating increased frictional engagement with the piston rod for preventing the motor vehicle body to sink down during an extended stationary period of time. furthermore, the pressure responsive sealing assembly is also adapted to generate reduced frictional engagement with the piston rod when the fluid pressure in the leakage chamber is relatively low.

19 Claims, 2 Drawing Sheets

HIGH PRESSURE SEALING SYSTEM AND METHOD

BACKGROUND OF THE INVENTION

The present invention relates generally to sealing a moveable member with respect to a fixed member and, more particularly, to a pressure responsive sealing system for inhibiting leakage of high pressure fluid from a working chamber of a hydraulic actuator.

Hydraulic actuators, such as shock absorbers, are used in connection with automotive suspension systems to absorb unwanted vibration (impacts, loads, etc.) which occurs during operation of the motor vehicle. To absorb the unwanted vibration, shock absorbers are generally connected between the body and the suspension of the motor vehicle for generating a damping force in response to relative movement therebetween. This damping force acts to counteract the unwanted vibration which would otherwise be transmitted from the suspension to the vehicle body. As is known, the greater the degree to which the flow of damping fluid within the working chamber is restricted by the piston valving, the greater the damping forces which are generated by the shock absorber.

Conventionally, shock absorbers have a seal member disposed between an upper end cap of the shock absorber and the piston rod for preventing damping fluid from leaking to the outside of the shock absorber upon reciprocal movement of the piston rod. Typically, these seals have a plurality of annular lips which engage the piston rod to prevent damping fluid from flowing therebetween. While such seals are generally effective in preventing leakage of damping fluid from the working chamber to the exterior of the shock absorber, suspension component manufacturers are continually working to improve the reliability and cost of sealing systems.

More particularly, in those suspension applications using high pressure hydraulic actuators to generate a lifting force for leveling the vehicle body, conventional seals tend to leak when the vehicle is stationary for an extended period of time. Moreover, conventional seals generate relatively large frictional forces between the piston rod and the seal member which must be overcome during operation of the shock absorber.

SUMMARY OF THE INVENTION

Accordingly, it is a primary object of the present invention to provide a method and apparatus for sealing a moveable member with respect to fixed member. More specifically, the present invention is directed to a pressure responsive sealing system for use in hydraulic actuators for retaining high pressure fluid on one side of the sealing system while inhibiting fluid leakage upon reciprocable movement of a rod or shaft member therethrough. Moreover, the pressure responsive sealing system of the present invention inhibits leakage upon the moveable rod member being held stationary for an extended period of time.

A related object of the present invention is to provide a pressure responsive sealing system for sealing a moveable piston rod with respect to a rod guide assembly in which the frictional forces associated with reciprocable movement of the piston rod relative to the sealing system are substantially reduced.

Accordingly, the sealing system of the present invention includes primary seal means which is adapted to allow a predetermine leakage flow thereacross for generating a pressure drop between the high pressure working chamber of the hydraulic actuator and a leakage chamber of a leakage return system. Pressure responsive secondary seal means, located above the leakage chamber, is operable for causing a substantially leak-proof seal with the piston rod when the hydraulic actuator is held in a stationary position. In addition, the pressure responsive secondary seal means permits the piston rod to move therethrough with low frictional resistance during reciprocable movement of the piston rod within the hydraulic actuator. Finally, third seal means, located above the secondary seal means, is provided to inhibit ingestion of water and dirt into the sealing system.

According to the preferred embodiments of the present invention, the leakage return system includes valve means for selectively controlling the flow of fluid between the leakage chamber and a low pressure fluid reservoir. The valve means is selectively operable in a first mode to interrupt flow from the leakage chamber to the low pressure reservoir when the hydraulic actuator is not operationable. In this manner, the secondary seal means is subjected to the relatively high fluid pressure within the leakage chamber so as to be energized for inhibiting leakage around the piston rod. As such, the sealing system inhibits the motor vehicle body for "sinking" after the fluid flow has been interrupted so as to maintain the desired vehicle trim height. When the hydraulic actuator is operational, the valve means is selectively operable in a second mode for permitting fluid to flow from the leakage chambers to the low pressure fluid reservoir. As such, the secondary seal means is only subjected to the relatively low fluid pressure within the leakage chamber for permitting the piston rod to move therethrough with relatively low frictional resistance.

BRIEF DESCRIPTION OF THE DRAWINGS

Various other advantages, objects and features of the present invention will become apparent to one skilled in the art upon reading the following specification and by reference to the following drawings in which.

DESCRIPTION OF THE PREFERRED EMBODIMENTS

In general, the present invention is directed to a sealing system for use with rotating or sliding members having a portion thereof moving within a fluidic medium. More specifically, the pressure responsive sealing system of the present invention is particularly well-suited for use in hydraulic actuators for retaining the hydraulic fluid under pressure at one side of the sealing system while inhibiting the transfer of the hydraulic fluid along the moveable rod member upon its reciprocable movement through the sealing system. For purposes of clarity, the pressure responsive sealing system of the present invention is shown incorporated in an exemplary hydraulic actuator of the typed used in an automotive leveling suspension system. However, it will be appreciated that the hydraulic actuator, hereinafter referred to as shock absorber 10, is merely exemplary of the numerous high pressure sealing applications to which the principles of the present invention are directed.

Figure 1:
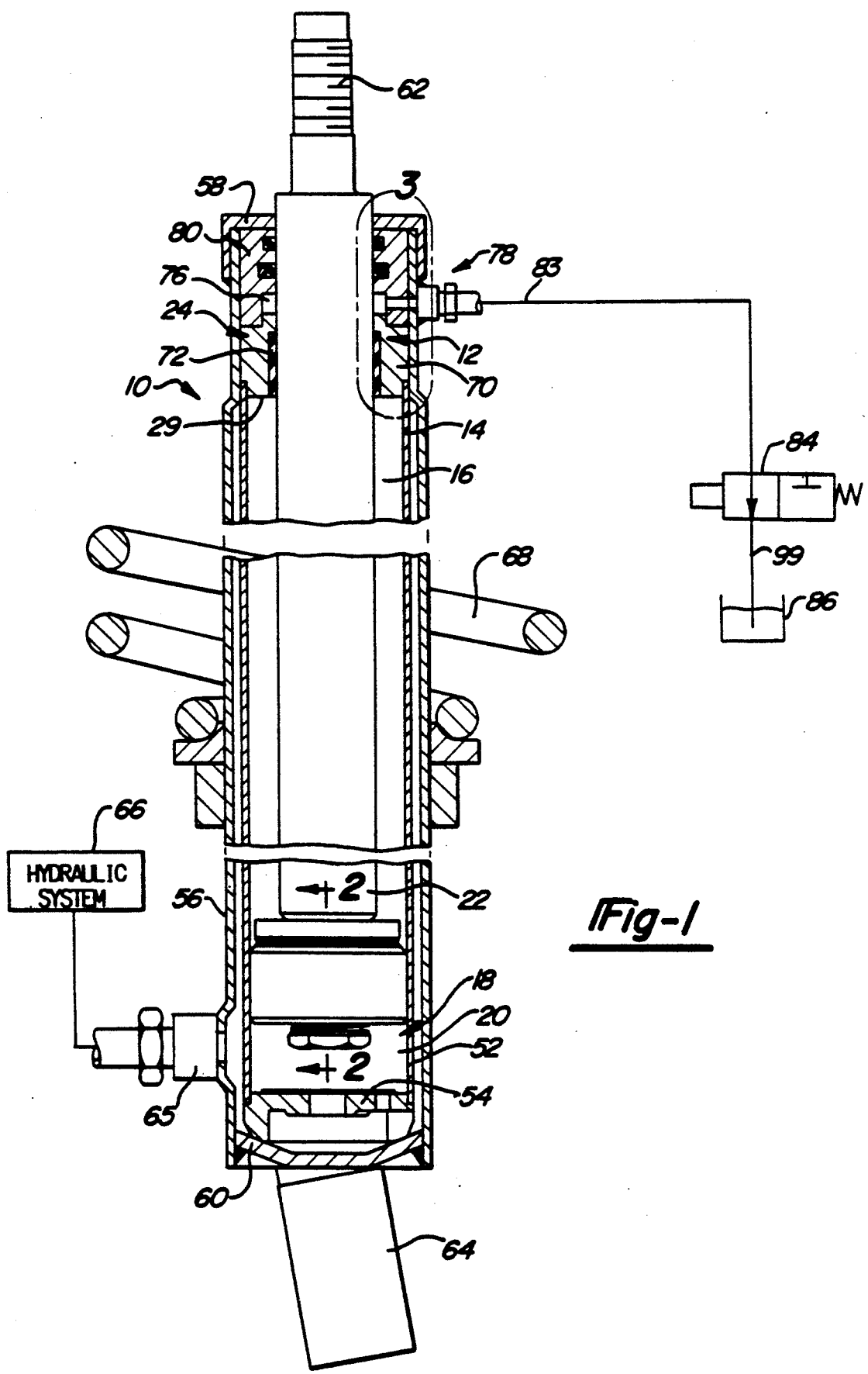
FIG. 1 is a reduced side elevational view of an exemplary hydraulic actuator incorporating the method and apparatus for sealing according to a first preferred embodiment of the present invention.

Referring now to FIG. 1, shock absorber 10 is shown to incorporate a sealing system 12 according to a first preferred embodiment of the present invention. Shock absorber 10 includes an elongated tubular pressure cylinder 14 which defines a working chamber 16 within which a hydraulic damping fluid is confined. Disposed for linear reciprocable movement within working chamber 16 is a piston assembly 18 having a piston 20 secured to one end of an axially extending piston rod 22. Piston 20 is oriented within pressure cylinder 14 so as to divide working chamber 16 into upper and lower portions. In addition, piston rod 22 is laterally supported by an annular rod guide assembly 24 which is disposed on an upper portion of pressure cylinder 14.

Figure 2:
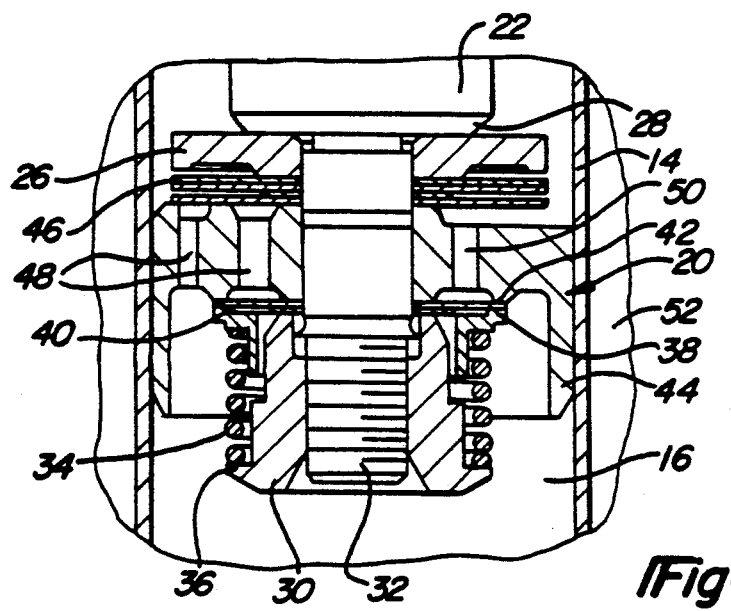
FIG. 2 is an enlarged cross-sectional view taken along line 2—2 of FIG. 1.

As best seen in FIG. 2, an exemplary valving arrangement for piston 20 is shown. Upward movement of piston 20 is limited by contact between an annular spacer 26, disposed between piston 20 and a radially extending step portion 28 of piston rod 22, and a lower surface 29 (FIG. 1) of rod guide assembly 24. Downward movement of piston 20 is limited by a threaded nut 30 or similar type fastening element which is threadably received upon a lower portion 32 of piston rod 22. A coil spring 34 is arranged concentrically around nut 28 and is supported at its lower end by a radially outwardly extending flange 36 formed on the lower end of nut 30. The upper end of coil spring 34 bears against a spring retainer 38 which, in turn, is biased to act against the underside of a plurality of lower valve disks 40. As such, coil spring 34 resiliently urges lower valve disks 40 into sealing engagement with valve seats 42 formed in a valve body member 44. In addition, a plurality of upper valve disks 46 are provided between valve body 44 and annular spacer 26. Upper valve disks 46 and lower valve disks 40 are used to control the flow of damping fluid across piston 20 through a plurality of flow passages 48 and 50, respectively. A further explanation of the construction and operation of exemplary piston 20 is disclosed in U.S. Pat. No. 4,113,072, which is hereby incorporated by reference. However, it is to be understood that piston 20 may include virtually any suitable flow controlling valving arrangement without limiting the fair scope of the present invention.

Those skilled in the art will appreciate that, upon reciprocal movement of piston 20, hydraulic damping fluid within working chamber 16 is transferred between the upper and lower portions thereof and between working chamber 16 and a fluid reservoir 52. By controlling the flow of damping fluid between the upper and lower portion of working chamber 16, shock absorber 10 is able to controllably dampen relative movement between the unsprung portions (i.e. front and rear suspensions) of the motor vehicle to which shock absorber 10 is interconnected so as to optimize ride, comfort and road handling ability.

A base valve, generally designated by the numeral 54, is located within the lower end of working chamber 16 and is used to control the flow of damping fluid between working chamber 16 and annular fluid reservoir 52. Annular fluid reservoir 52 is defined as the space between the outer periphery of pressure cylinder 14 and the inner periphery of a reservoir tube 56 which is arranged concentrically around the exterior of pressure cylinder 14. The construction and operation of base valve 54 may be of the type shown and described in U.S. Pat. No. 3,771,626, which is hereby incorporated by reference.

The upper and lower ends of shock absorber 10 are provided with generally cupshaped upper and lower end caps 58 and 60, respectively. End caps 58 and 60 are secured to opposing ends of reservoir tube 56 by suitable means such as welding. Accordingly, the housing for shock absorber 10 comprises end caps 58 and 60 as well as reservoir tube 56. Suitable end fittings 62 and 64 are secured to the upper end of piston rod 22 and lower end cap 60, respectively, for operatively interconnecting shock absorber 10 between the body and the axle assembly of the motor vehicle.

With continued reference to FIG. 1, exemplary shock absorber 10 is shown to include fluid inlet means 65 for interconnecting one of annular fluid reservoir 52 and working chamber 16 to a central hydraulic system, diagrammatically shown as block 66. The central hydraulic system 66 is provided for selectively adding and removing hydraulic fluid from shock absorber 10 in response to a signal from position sensors or the like (not shown) for controllably adjusting the "trim" height level of the vehicle body relative to the suspension. Moreover, a secondary support member, shown as a helical compression spring 68 concentrically surrounding the outer periphery of reservoir tube 56, is provided for mechanically supporting the vehicle body relative to the suspension.

Figure 3:
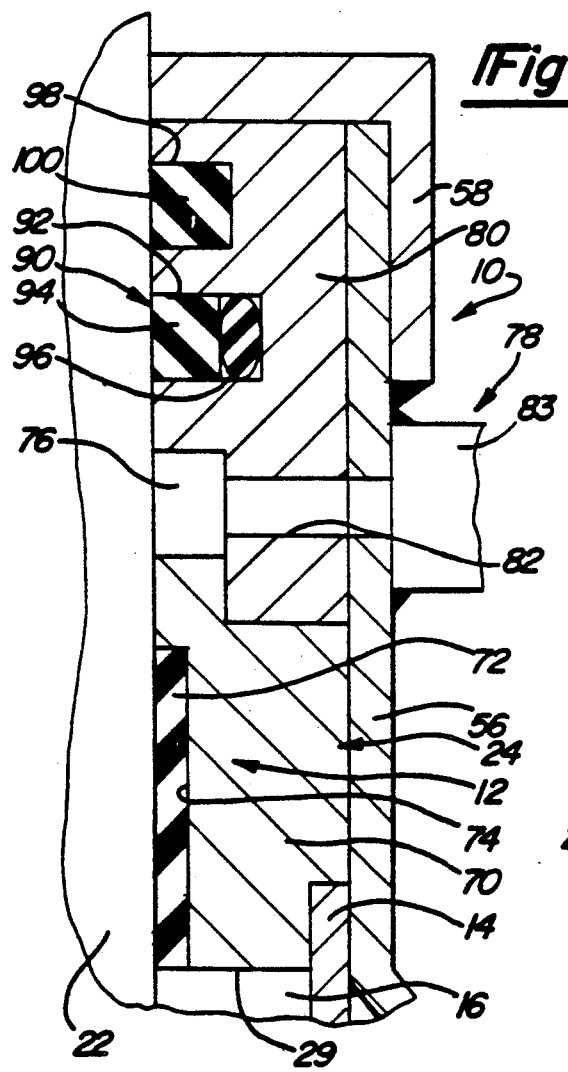
FIG. 3 is an enlarged cross-sectional view of a portion of the pressure responsive sealing system shown in circle 3 of FIG. 1.

With particular reference now to FIG. 3, a first preferred embodiment of pressure responsive sealing system 12 of the present invention is shown in greater detail. More particularly, sealing system 12 is shown generally integrated into annular rod guide assembly 24. Rod guide assembly 24 includes a lower rod guide member 70 provided adjacent working chamber 16 for laterally supporting piston rod 22. A first or primary seal member 72 is concentrically disposed intermediate piston rod 22 and lower rod guide member 70 within a radial recess 74 formed in lower rod guide member 70. Primary seal member 72 is sized to form a close sliding fit with piston rod 22. More particularly, primary seal member 72 is adapted to provide a predetermined clearance with piston rod 22 for defining a fluid leakage communication path between working chamber 16 and an annular leakage chamber 76. In this manner, primary seal member 72 causes a relatively large pressure drop from the upper portion of working chambers 16 to annular leakage chamber 76 of a fluid leakage return system 78. As such, the predetermined clearance between piston rod 22 and the inner periphery of primary seal member 72 permits only slight fluid leakage flow which represents a very small energy loss to hydraulic system 66. In addition, primary seal member 72 may also be adapted to function as a bearing support member for transmitting side loads from piston rod 22 to lower rod guide member 70. As best seen in FIG. 3, primary seal member 72 is an elongated tubular sleeve fabricated from any suitable material such as bronze or PTFE.

With reference to FIGS. 1 and 3, leakage return system 78 is shown to include annular leakage chamber 76 formed between mating radial stepped portions of lower rod guide member 70 and an upper rod guide member 80. In addition, a radial flow passage 82 extends through upper rod guide member 80 defining an outlet 83 for permitting fluid communication between leakage chamber 76 and valve means 84. Preferably, valve means 84 is a one-way flow control valve which is selectively controllable for opening and closing fluid flow from leakage chamber 76 to a low pressure reservoir 86 of central hydraulic system 66. To inhibit leakage of the hydraulic fluid within leakage chamber 76, pressure "energizable" or responsive sealing means are provided for inhibiting leakage between upper rod guide member 72 and piston rod 22. The pressure responsive sealing means includes a secondary seal assembly 90, disposed within an annular groove 92 formed in upper rod guide member 80, concentrically surrounding a portion of piston rod 22 supported above leakage chamber 76. Secondary seal assembly 90 is adapted to withstand a range of variable fluid pressures without permitting fluid to pass thereby. More particularly, secondary seal assembly 90 is pressure "responsive" for operation in a manner to be discussed hereafter in greater detail.

With continued reference to FIGS. 1 and 3, secondary seal assembly 90 is shown to include a relatively rigid seal ring 94 disposed in annular groove 92 for sealing engagement with piston rod 22. Seal ring 94 is biased radially inwardly by an O-ring 96 which causes seal ring 94 to generate a substantially leak-proof seal at the various fluid pressures. Upper rod guide member 80 also includes a second annular groove 98 formed above first annular groove 92 and in which is disposed a third seal member 100 provided for preventing any external particles (i.e. dirt and dust) from entering sealing system 12 or working chamber 16 upon reciprocable movement of piston rod 22.

In operation, when the fluid pressure within leakage chamber 76 is relatively low, secondary seal assembly 90 permits piston rod 22 to move with relatively low frictional resistance. Valve means 84, schematically shown in FIG. 1, can be selectively actuated (i.e. electrically, hydraulically or mechanically) to define a first mode position operable for closing off the fluid communication path 99 between leakage chamber 76 and low pressure reservoir 86 when piston rod 22 is held stationary for a predetermined extended period of time. Such selective closure of valve means 84 subjects secondary seal assembly 90 to increased fluid pressure within leakage chamber 76. This, in turn, energizes secondary seal assembly 90 for generating relatively high frictional forces on piston shaft 22 so as to inhibit leakage. Alternatively, upon linear reciprocal movement of piston rod 22 relative to rod guide assembly 24, valve means 84 is selectively actuated to a second mode position operable to permit the fluid leaking past primary seal member 72 to flow to low pressure fluid reservoir 86 of central hydraulic system 66. As such, secondary seal assembly 90 is only subjected to the lower fluid pressures within leakage chamber 76 for enabling piston rod 22 to move relative thereto while experiencing relatively low frictional resistance. As such, the pressure responsive sealing system 12 of the present invention substantially inhibits any fluid leakage to the exterior of shock absorber 10. Therefore, a vehicle equipped with a hydraulic suspension system may retain its preferred height or trim level even when stationary for an extended period of time.

Figure 4:
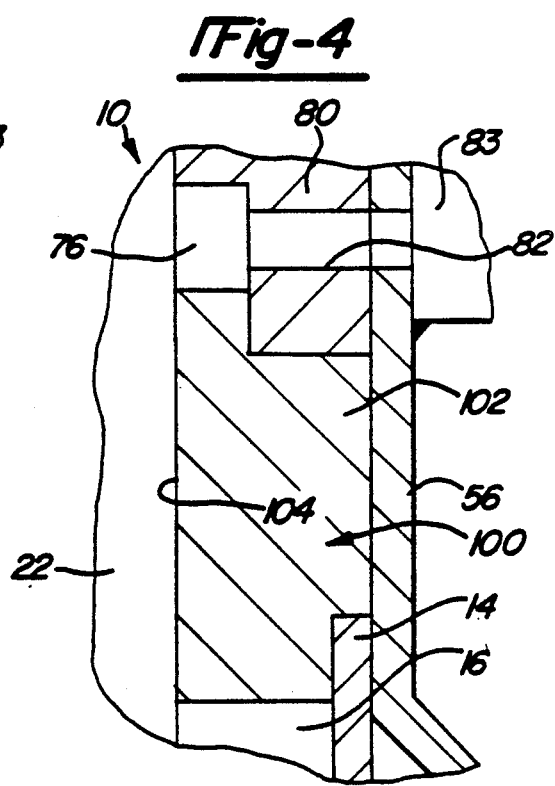
FIG. 4 is an enlarged cross-sectional view, similar to FIG. 3, showing a second preferred embodiment of the high pressure responsive sealing system of the present invention.

With particular reference now to FIG. 4, an alternative preferred embodiment of a pressure responsive sealing system 100 is shown in greater detail. In general, sealing system 100 functions substantially identical to that previously described in reference to sealing system 12. Therefore, like numbers are used to designate components having been previously described. The alternative embodiment discloses the elimination of primary seal member 72 by incorporating its function into lower rod guide member 102. More particularly, lower rod guide member 102 has a central aperture 104 sized to define the predetermined slight clearance with piston rod 22 for allowing leakage flow from working chamber 16 to leakage chamber 76. The operative function of the remaining components being substantially identical as herebefore described.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A sealing system for a hydraulic actuator having a housing and a piston rod adapted for reciprocal movement relative to said housing, said piston rod being partially disposed within hydraulic fluid confined in a working chamber within said housing, said sealing system comprising:

guide means located intermediate said working chamber and a first end of said housing for supporting said piston rod upon reciprocable movement therethrough;

a leakage chamber formed in said guide means intermediate said working chamber and said first end of said housing;

first seal means operable for permitting hydraulic fluid to leak from said working chamber into said leakage chamber;

a low pressure fluid reservoir;

means interconnecting said leakage chamber and said low pressure fluid reservoir for providing a fluid communication path therebetween;

valve means for selectively controlling the flow of hydraulic fluid from said leakage chamber to said fluid reservoir, said valve means operable in a first position to interrupt flow to said fluid reservoir for causing an increase in fluid pressure within said leakage chamber, and a second position permitting flow to said fluid reservoir for causing a reduced fluid pressure within said leakage chamber;

second seal means engaging said piston rod intermediate said leakage chamber and said first end of said housing and operable to inhibit leakage of hydraulic fluid therebetween, said second seal means being energizable in response to said fluid pressure within said leakage chamber for generating increased frictional resistance to movement of said piston rod when said valve means is in said first position so as to inhibit leakage of fluid past said piston rod, and for generating a reduced frictional resistance to movement of said piston rod when said valve means is in said second position; and actuating means for moving said valve means to said second position upon reciprocal movement of said piston rod, said actuating means operable to move said valve means to said first position upon said piston rod being stationary for a predetermined period of time.

2. The sealing system of claim 1, wherein said first seal means is provided intermediate said working chamber and said leakage chamber for permitting a predetermined amount of hydraulic fluid to leak along said piston rod so as to cause a reduction in the fluid pressure between said working chamber and said leakage chamber.

3. The sealing system of claim 2, wherein said first seal means is a tubular seal member concentrically disposed intermediate said piston rod and said guide means within an annular recess formed in said guide means so as to define a predetermined clearance therebetween.

4. The sealing system of claim 2, wherein said first seal means is an integral portion of said guide means formed to concentrically surround said piston rod so as to define a predetermined clearance therebetween.

5. The sealing system of claim 2, wherein said second seal means is a pressure responsive seal assembly disposed in a first annular groove formed in said guide means which is operable for inhibiting leakage of hydraulic fluid along said piston rod from said leakage chamber to the exterior of said housing.

6. The sealing system of claim 5, wherein said pressure responsive seal assembly includes a relatively rigid seal ring provided in sealing engagement with said piston rod, and biasing means for biasing said seal ring radially inwardly into biased engagement with said piston rod.

7. The sealing system of claim 5 further comprising third seal means provided intermediate said second seal means and said first end of said housing and which is operable for preventing external particles from entering said second seal means and said first seal means upon reciprocable movement of said piston rod.

8. The sealing system of claim 7, wherein said hydraulic actuator is a hydraulic shock absorber of the type used in motor vehicles for dampening relative movement between sprung and unsprung portions thereof.

9. A sealing system for a hydraulic actuator connecting the sprung and unsprung portions of a motor vehicle, said sealing system operable to selectively change the frictional sealing force exerted on a piston rod in response to the fluid pressure acting thereon, said hydraulic actuator including a cylinder forming a working chamber operable to store hydraulic damping fluids, a piston and rod assembly partially disposed within said cylinder for defining first and second portions of said working chamber, said piston and rod assembly being moveable within said cylinder, and a rod guide provided intermediate said working chamber and an upper end of said cylinder for supporting said piston rod upon reciprocal movement therethrough, said sealing system comprising:

an annular leakage chamber formed in said rod guide between said working chamber and said upper end of said cylinder;

first seal means operable for permitting a predetermined amount of hydraulic fluid to leak from said working chamber to said leakage chamber;

a remotely located low pressure fluid reservoir;

means interconnecting said leakage chamber and said remote low pressure fluid reservoir for providing a fluid communication path therebetween;

flow control means for selectively controlling the flow of hydraulic fluid from said leakage chamber to said fluid reservoir, said flow control means operable in a first position to interrupt flow to said fluid reservoir for causing increased fluid pressure within said leakage chamber, and said flow control means operable in a second position for permitting hydraulic fluid to flow from said leakage chamber to said fluid reservoir for causing reduced fluid pressure within said leakage chamber;

pressure responsive seal means engaging said piston rod intermediate said leakage chamber and said upper end of said cylinder, said pressure responsive seal means operable to inhibit leakage of hydraulic fluid along said piston rod from said leakage chamber to the exterior of said cylinder, said pressure responsive sealing means being energizable in response to said fluid pressure within said leakage chamber for generating increased frictional resistance to movement of said piston rod when said flow control means is in said first position, and for generating reduced frictional resistance on said piston rod when said flow control means in said second position; and actuating means for moving said flow control means between said first and second positions such that said actuating means moves said flow control means to said second position upon reciprocal movement of said piston rod, and said actuating means moves said flow control means to said first position upon said piston rod being held stationary for a predetermined period of time.

10. The sealing system of claim 9, wherein said first seal means is located intermediate said working chamber and said leakage chamber for permitting hydraulic fluid to leak along said piston rod while causing a reduction in fluid pressure between said working chamber and said leakage chamber.

11. The sealing system of claim 10, wherein said first seal means is a tubular sleeve member concentrically disposed between said piston rod and said rod guide so as to define a predetermined clearance therebetween.

12. The sealing system of claim 10, wherein said first seal means is an integral portion of said rod guide which is formed to concentrically surround said piston rod for defining a predetermined clearance therebetween.

13. The sealing system of claim 10, wherein said pressure responsive seal means is a seal assembly disposed in a first annular groove formed in said rod guide which is operable for inhibiting leakage of hydraulic fluid along said piston rod from said leakage chamber to the exterior of said cylinder.

14. The sealing system of claim 13, wherein said pressure responsive seal assembly includes a relatively rigid elastomeric seal ring provided in sealing engagement with said piston rod, and biasing means for biasing said elastomeric seal ring radially inwardly into biased engagement with said piston rod.

15. The sealing system of claim 14 further comprising third seal means disposed in a second annular groove formed in said rod guide between said pressure responsive seal assembly and said upper end of said cylinder, said third seal means being operable for preventing external particles from entering said leakage chamber and said working chamber upon reciprocal movement of said piston rod.

16. The sealing system of claim 14, wherein said flow control means is a one-way flow control valve associated with said means interconnecting said leakage chamber to said low pressure fluid reservoir.

17. A method of sealing a moveable piston rod upon movement through a sealing system positioned between a working chamber and a first end of a hydraulic actuator, said piston rod being partially disposed in hydraulic fluid confined within said working chamber, said method comprising the steps of:

providing rod guide means intermediate said working chamber and said first end of said hydraulic actuator for laterally supporting said piston rod upon reciprocal movement therethrough;

disposing first seal means between said piston rod and said rod guide means, said first seal means operable to permit a predetermined leakage flow from said working chamber to an annular leakage chamber formed in said rod guide means;

interconnecting said leakage chamber to a low pressure fluid reservoir for providing a fluid communication path therebetween;

disposing second seal means in engagement with said piston rod and intermediate said leakage chamber and said first end of said actuator for inhibiting leakage of fluid along said piston rod from said leakage chamber to the exterior of said hydraulic actuator;

energizing said second seal means in response to an increase in fluid pressure within said leakage chamber so as to increase the frictional engagement between said piston rod and said second seal means upon said piston rod being held stationary for a predetermined period of time;

energizing said second seal means in response to a decrease in fluid pressure within said leakage chamber for causing reduced frictional engagement between said piston rod and said second seal means during movement of said piston rod;

selectively controlling the flow of hydraulic fluid from said leakage chamber to said fluid reservoir for energizing said second seal means in response to the fluid pressure within said leakage chamber.

18. The method of claim 17, wherein said flow controlling step comprises providing flow control valve means intermediate said leakage chamber and said fluid reservoir, said flow control valve means operable in a first position for energizing said second seal means for causing said increased frictional resistance by interrupting fluid flow from said leakage chamber to said fluid reservoir, and wherein said flow control valve means is operable in a second position for causing said reduced frictional resistance by permitting fluid flow from said leakage chamber to said fluid reservoir; and 19. The method of claim 18 further comprising the step of disposing third seal means intermediate said second seal means and said first end of said hydraulic actuator for preventing external particles from entering said first and second seal means upon reciprocable movement of said piston rod.

* * * * *

UNITED STATES PATENT AND TRADEMARK OFFICE
CERTIFICATE OF CORRECTION

PATENT NO. : 5,107,970
DATED : April 28, 1992
INVENTOR(S) : Jan N. Driessen et al.

It is certified that error appears in the above-identified patent and that said Letters Patent is hereby corrected as shown below:

Abstract, line 26,
"furthermore" should be --Furthermore--.

Column 1, line 68,
"predetermine" should be --predetermined--.

Column 3, line 4,
"typed" should be --type--.

Column 5, line 13,
"72" should be --80--.

Column 8, line 21, claim 9,
After "means", insert --is--.

Column 10, line 7, claim 17,
After "rod;", insert --and--.

Column 10, line 22, claim 18,
After "reservoir", delete "; and" and insert --.--.

Signed and Sealed this

Twenty-sixth Day of October, 1993

Attest:

BRUCE LEHMAN

*Attesting Officer*       *Commissioner of Patents and Trademarks*